United States Patent [19]

Brothers

[11] 3,839,778

[45] Oct. 8, 1974

[54] SEALING METHOD

[75] Inventor: Jack Brothers, Fort Walton Beach, Fla.

[73] Assignee: Jerry Pentel, Roxbury Twp., R.D. Flanders, N.J., a part interest

[22] Filed: July 5, 1973

[21] Appl. No.: 376,560

Related U.S. Application Data

[62] Division of Ser. No. 312,619, Dec. 6, 1972, Pat. No. 3,782,587.

[52] U.S. Cl............................ 29/432, 29/526, 277/1, 285/3, 285/336
[51] Int. Cl............................................. B23p 11/00
[58] Field of Search ............. 29/413, 416, 432, 526; 220/46 R; 285/336, 363 X, 368, 3; 277/1

[56] References Cited
UNITED STATES PATENTS

| | | | |
|---|---|---|---|
| 1,155,963 | 10/1915 | Schaller ........................ | 220/46 R X |
| 1,833,030 | 11/1931 | McClatchie ................... | 29/432 UX |
| 2,182,995 | 12/1939 | Pepper et al ................. | 285/336 X |
| 2,260,542 | 10/1941 | Shaffer ......................... | 285/336 |
| 2,922,666 | 1/1960 | Lange et al. .................. | 285/363 X |
| 3,058,750 | 10/1962 | Taylor ........................... | 277/1 |
| 3,147,537 | 9/1964 | Fadow .......................... | 29/432 UX |
| 3,237,279 | 3/1966 | Kohlhagen et al. ........... | 29/432 X |

FOREIGN PATENTS OR APPLICATIONS

1,154,215  6/1969  Great Britain ......................... 277/1

*Primary Examiner*—Charlie T. Moon
*Attorney, Agent, or Firm*—Joseph T. Skelley

[57] ABSTRACT

The method contemplates the sealing of a fluid joint, formed of interfacing elements of indeterminate configuration along the joint, where the elements have recesses formed in the interfacing surfaces, by forming a sealing element of ductile material to conform to the indeterminate configuration by die-cutting the material to separate out a sealing sub-element which cooperates with the interfacing surfaces, and collateral resilient seals, the latter under a constant, high pressure constraint, to define a plurality of compliant and resilient sealing surfaces.

2 Claims, 7 Drawing Figures

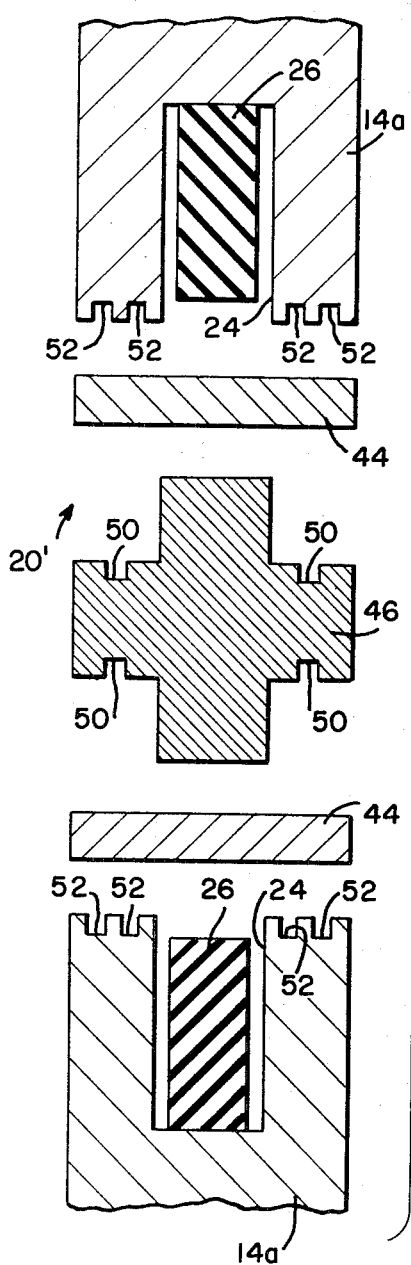
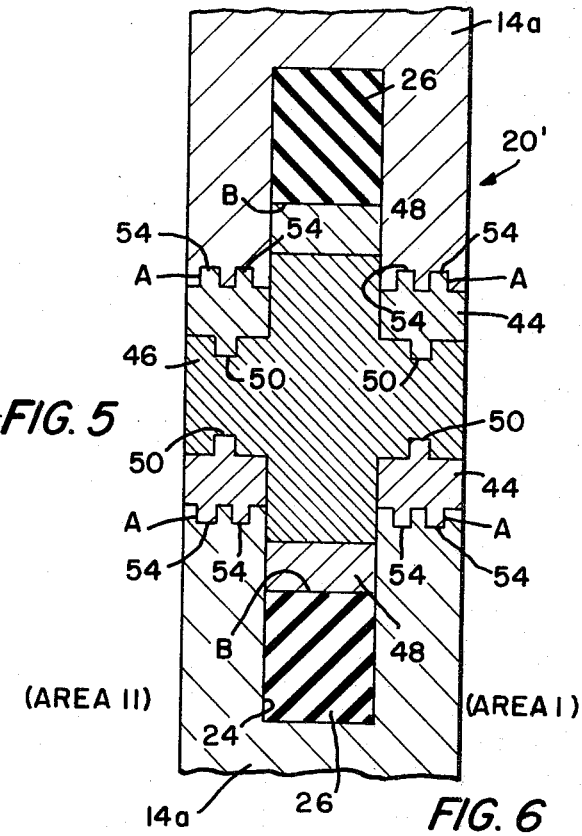
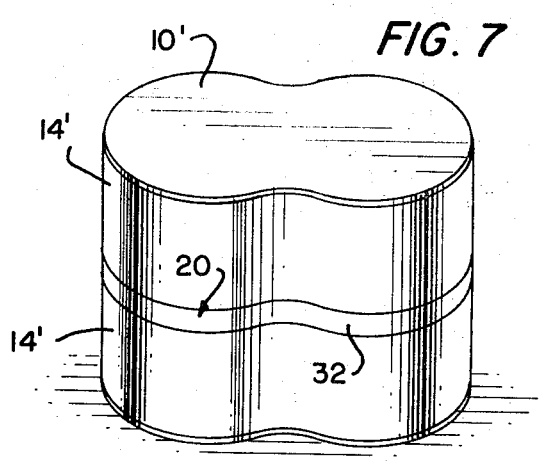
FIG. 5
FIG. 6
FIG. 7

SEALING METHOD

This is a division of application Ser. No. 312,619, filed Dec. 6, 1972, now U.S. Pat. No. 3,782,587.

This invention pertains to sealing methods, and in particular to such methods in which a principal sealing sub-element is formed, in the sealing or closure operation, to conform to an indeterminate configuration which obtains between those elements which interface to form a fluid joint.

Sealing means and methods are known, in the prior art, wherein interfacing elements of indeterminate configuration have sealing members of complementary configuration disposed therebetween. However, it is a manufacturing expense and burden to have to conform the sealing members to the indeterminate configuration. It would be less expensive and more expedient to be able to seal a fluid joint between interfacing elements of indeterminate configuration by die-cutting a sealing member therefor in the process of closing the interfacing elements upon each other.

Also, in the prior art it is known to close a fluid joint through the use of resilient sealing members or compliant members. Yet, in the former practice, the very resilience of the sealing member renders it yieldable before fluid pressure and liable to leakage. In the latter practice where, for instance, a ductile material sealing element is deployed, the sealing element is compressed to an optimum configuration, resistant of the fluid pressure, but it retains the compressed configuration. It has no dynamic property, thus upon being subjected to temperature excursions it can permit unwanted fluid leakage. A more efficient sealing method would comprise that which incorporates the efficiency of both the resilient seal, responsive to temperature excursions, and the dynamic seal with its attendant strength.

It is an object of this invention, then, to teach more efficient sealing methods than those known in or offered by the prior art.

Specifically, it is an object of this invention to set forth a method of sealing a fluid joint, wherein the joint is formed by interfacing elements of indeterminate configuration along the joint, and said elements have recesses formed in the interfacing surfaces thereof, comprising the steps of disposing resilient elements in said recesses, interpositioning a ductile member between said surfaces, and cutting a sealing sub-element of said indeterminate configuration from said ductile member, wherein said cutting step comprises forcing said surfaces to close upon said ductile member, thus separating said sealing sub-element from said ductile member, and urging the separated sealing sub-element against said resilient elements.

A feature of this invention comprises the sealing of a fluid joint, formed of interfacing elements of indeterminate configuration along the joint, where the elements have recesses formed in the interfacing surfaces, by forming a sealing sub-element of ductile material into conformity with the indeterminate configuration. The sub-element is formed by a die-cutting of the material, separating out the sub-element for cooperation with the interfacing surfaces and resilient seals, to define a plurality of compliant and resilient sealing surfaces.

Further objects and features of this invention will become more apparent by reference to the following description, taken in conjunction with the accompanying figures, in which.

FIGS. 5 and 6, respectively, are an exploded view and an operatively closed view of an alternate embodiment of a seal which practices the invention; and FIG. 7 is a perspective view of a pressure vessel of non-uniform cross-section in which, by way of example, the novel sealing method has a particular facility and utility.

Figure 1:
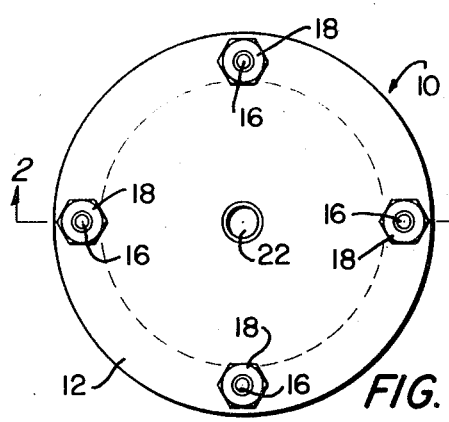
FIG. 1 is a plan view of a pressure vessel which uses the novel sealing method.
Figure 2:
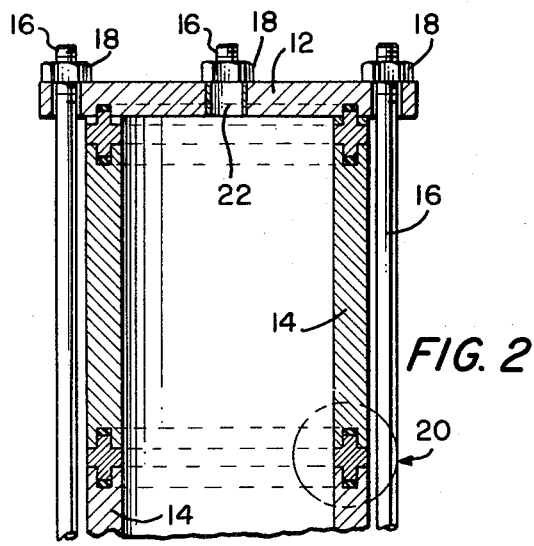
FIG. 2 is a cross-sectional view of the pressure vessel of FIG. 1, taken along section 2-2 thereof, showing an embodiment of sealing means which practice the novel method, in use therein.

As shown in FIGS. 1 and 2, a pressure vessel 10 (only a portion thereof being being shown) is comprised of an end closure 12, a plurality of co-active cylindrical wall members 14, and enveloping through-bolts 16 which, with lock nuts 18, constrain the wall members 14 against the sealing means 20 which practices the method. The end closure 12 has a port 22 formed therein for the address thereat of a vacuum or fluid pressure.

Figure 4:
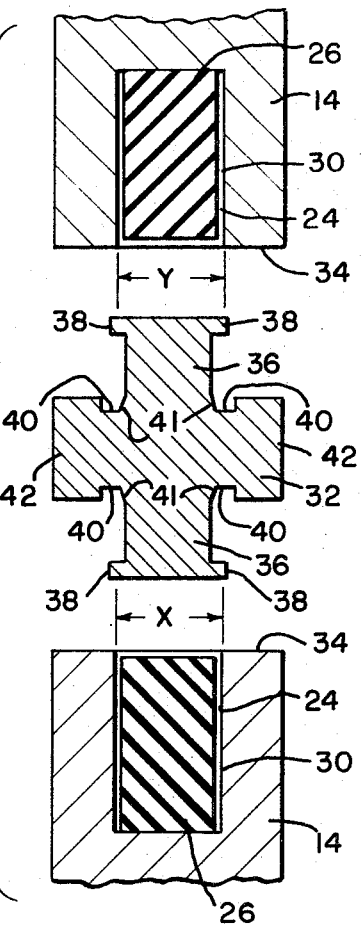
FIG. 4 is an exploded view of the sealing means of FIG. 3, the same depicting the structure of the sealing means prior to the closure of the interfacing elements of the fluid joint of the pressure vessel onto the sealing means.
Figure 3:
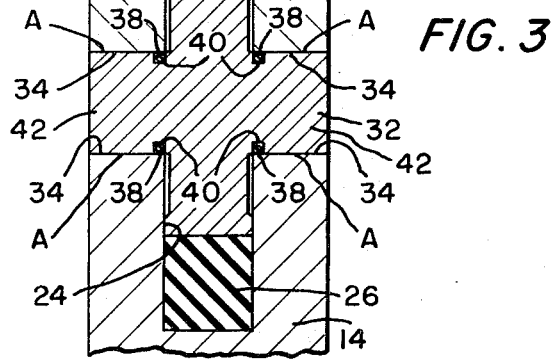
FIG. 3 is an enlarged cross-sectional view of a portion of the vessel of FIGS. 1 and 2, showing the sealing means in greater detail.

The sealing means 20 is shown in greater detail in FIGS. 3 and 4. Here it can be seen that the wall members 14 have recesses 24 formed therein to receive resilient sealing elements 26 therewithin. Optionally, only to facilitate assembly, a terminal and readily degradable cement may be used at 28 to cause elements 26 to hold positioning until the wall members 14 have been closed upon the sealing means 20. To allow for a compression-induced expansion or "thickening growth" of the elements 26, lateral spaces 30 are provided between the walls of the recesses 24 and the sides of the elements 26.

A cross-sectionally, cruciform-shaped, ductile element 32 is interpostioned between the interfacing surfaces 34 of wall members 14. Oppositely-disposed limbs 36 of the element 32 have a cross-sectional dimension X which is complementary to the width Y of recesses 24. However, the limbs 36 have terminal shoulders 38 formed thereon which, with pressured closure of the wall members toward each other, are sheared off. To accommodate for the compressed nesting of the sheared-off shoulders 38, the ductile element has recesses 40, and tapered surfaces 41, formed in the other pair of limbs 42. According to the method the sealing elements 26 are disposed in recesses 24. Then, the ductile element 32 is interpositioned between surfaces 34. By torquing the lock nuts 18, the wall members 14 are forced towards each other — resulting in a shearing off of the shoulders 38, the nesting of the shoulders into the recesses 40, a compression of sealing elements 26, and a deformable compression of limbs 42.

Simply, the wall members 14 are compressed into/against the limbs 42 with that pressure which equals or exceeds the pressure of the fluid to be contained by the vessel 10 — or, a compression complementary to a vacuum to be contained by the vessel.

The ductile element 32, which may be formed of lead, copper, soft steel, or the like, yields under pressure and meets the optimum configuration along the length thereof, and the narrowed cross-sectional dimension, which will contain the fluid pressure or vacuum. The limbs 42 are squeezed between surfaces 34, and shoulders 38 are sheared off and deposited, compressively, within recesses 40.

In the alternate embodiment 20' of sealing means which practice the method, wall members 14a, as shown in FIGS. 5 and 6, close upon a plurality of ductile elements 44 — again that resilient elements 26 might be compressed into recesses 24. In this embodiment, however, a cutting die 46 is employed. Die 46 punches out a conforming sealing sub-element 48 which, like the embodiment of FIGS. 3 and 4, compresses the resilient elements 26. Further, however, the die 46 has recesses 50 formed in opposed limbs thereof which receive portions of the residual components of the ductile elements 44 therewithin.

To effect an enhanced sealing, the wall members 14a have a plurality of recesses 52 formed therein which cooperate with the recesses 50 to disrupt the elements 44, to either sides thereof, to cause a nesting of portions 54 within same.

As represented in FIGS. 3 and 6, the embodiments of the novel sealing means present a plurality of four compliant sealing surfaces A and a pair of resilient sealing surfaces B to the oppositely disposed fluid pressure areas: "Area I" and "Area II."

The sealing method, as disclosed, is usable on cylindrical vessels, linear walls, and joined closure members of non-linear configuration. Novelly, the disclosure teaches methodology for forming the ductile element — as sealing element 44, for instance — into a conformity with the sealing configuration as required.

FIG. 7 presents a perspective view of a pressure vessel 10' in which wall members 14', for instance, compress a sealing means 20 therebetween. In such an application of the sealing method, of course, the ductile element 32 needs only to be roughly conformed, by hand, to the undulated periphery of the wall members 14'. Upon closure of the wall members 14' toward each other, a conforming, die-cutting of element 32 is realized.

In the prior art, it has been necessary to machine the mating surfaces of closure members, such as members 14 or 14a, to a required configuration. Thereafter, according to the prior practices, it has been necessary to define a closure element, such as element 46, of the corresponding configuration. Finally, it has been the required practice to machine a further sealing element, similar to element 44, into the prescribed configuration. According to the instant teaching, it is quite unnecessary to machine an element such as element 44 to any precise configuration. Rather, as the method herein discloses, it is only necessary to interpose a ductile element of sufficient width between interfacing surfaces of members 14a, and/or an element 46, to die-cut and form a requisite sealing element therefrom.

At great expense, then, and with the expenditure of valuable machinist's time and expertise, the prior art has required that the method for sealing a fluid joint of some indeterminate configuration have all elements of the sealing means be pre-formed in the requisite configuration for a closure of the joint. The instant teaching obviates the requirement for the ductile element to be pre-machined and/or performed. Rather, it is the present teaching herein for the ductile element to be cut-to-fit, in the process of assembling and closing the sealing means, to meet the sealing requirement.

While the invention has been described in connection with specific embodiments of sealing means which practice the invention, it is to be clearly understood that this is done only by way of example, and not as a limitation to the scope of the invention as set forth in the objects thereof and in the appended claims.

I claim:

1. A method of sealing a fluid joint, wherein the joint is formed by interfacing elements of indeterminate configuration along the joint, and said elements have recesses formed in the interfacing surfaces thereof, comprising the steps of:
  disposing resilient elements in said recesses;
  interpositioning a ductile member between said surfaces; and
  cutting a sealing sub-element of said indeterminate configuration from said ductile member; wherein said cutting step comprises forcing said surfaces to close upon said ductile member, thus separating said sealing sub-element from said ductile member, and urging the separated sealing sub-element against said resilient elements.

2. A method, according to claim 1, wherein:
  said interpositioning step comprises the interpositioning of a plurality of ductile elements between said surfaces; and further including
  disposing a cutting die between elements of said plurality thereof;
  forceably closing said surfaces upon said plurality of ductile elements and said die, thus separating a plurality of sealing sub-elements from said plurality of ductile elements, and urging the separated sealing sub-elements against said resilient elements.

* * * * *